US012517245B2

United States Patent
Syljuasen et al.

(10) Patent No.: US 12,517,245 B2
(45) Date of Patent: Jan. 6, 2026

(54) ULTRASOUND SCANNING SYSTEM

(71) Applicant: DolphiTech AS, Gjovik (NO)

(72) Inventors: Oyvind Arne Syljuasen, Gjovik (NO); Eskil Skoglund, Gjovik (NO); Bjorn-Harald Thirud, Gjovik (NO); Yngve Raudberget, Gjovik (NO)

(73) Assignee: DolphiTech AS, Gjøvik (NO)

( * ) Notice: Subject to any disclaimer, the term of this patent is extended or adjusted under 35 U.S.C. 154(b) by 228 days.

(21) Appl. No.: 18/036,320

(22) PCT Filed: Nov. 11, 2021

(86) PCT No.: PCT/EP2021/081360
§ 371 (c)(1),
(2) Date: May 10, 2023

(87) PCT Pub. No.: WO2022/101331
PCT Pub. Date: May 19, 2022

(65) Prior Publication Data
US 2023/0341549 A1    Oct. 26, 2023

(30) Foreign Application Priority Data
Nov. 11, 2020  (GB) ..................... 2017816

(51) Int. Cl.
*G01S 15/89*    (2006.01)
*G01S 7/52*    (2006.01)

(52) U.S. Cl.
CPC ........ *G01S 15/8993* (2013.01); *G01S 7/5209* (2013.01); *G01S 15/8915* (2013.01)

(58) Field of Classification Search
CPC ........... G01N 29/2481; G01N 29/0654; G01N 29/0645; G01N 29/262; G01S 7/5209;
(Continued)

(56) References Cited

U.S. PATENT DOCUMENTS

2008/0114255 A1* 5/2008 Schwartz ............. A61B 8/4483
600/474
2011/0061466 A1* 3/2011 Nishino ................. A61B 8/461
73/632
(Continued)

FOREIGN PATENT DOCUMENTS

WO    WO 2019/198785    10/2019
WO    WO-2019198785 A1 *  10/2019 ............... A61B 8/15

OTHER PUBLICATIONS

International Search Report and Written Opinion in International Appln. No. PCT/EP2021/081360, mailed Mar. 16, 2022, 20 pages.
(Continued)

*Primary Examiner* — Daniel L Murphy
*Assistant Examiner* — Amie M Ndure
(74) *Attorney, Agent, or Firm* — Fish & Richardson P.C.

(57) ABSTRACT

A scanning system for imaging structural features below the surface of an object, the scanning system comprising: a transducer module configured to transmit ultrasound signals towards an object and to receive ultrasound signals reflected from the object whereby data pertaining to an internal structure of the object can be obtained, the transducer module being configured to transmit and receive ultrasound signals for each of a first frame and a subsequent second frame in an ultrasound scan comprising the first and second frames; an image generation module configured to generate image data representative of the object based on the received ultrasound signals; and a communication module for communicating with a remote device, the communication module being configured to send, to the remote device: a set of received ultrasound signals based on ultrasound signals received during the first frame of the scan, and image data generated based on ultrasound signals received during the second frame of the scan.

19 Claims, 7 Drawing Sheets

(58) Field of Classification Search
CPC ............. G01S 15/8993; G01S 15/8915; G01S 7/5208; G01S 15/8927
See application file for complete search history.

(56) References Cited

U.S. PATENT DOCUMENTS

| | | | | |
|---|---|---|---|---|
| 2012/0316443 | A1* | 12/2012 | Katou | A61B 8/4483 600/447 |
| 2013/0060142 | A1* | 3/2013 | Ishihara | A61B 8/14 600/447 |
| 2013/0079638 | A1* | 3/2013 | Osawa | A61B 8/4494 600/443 |
| 2014/0148698 | A1* | 5/2014 | Tamano | G01S 7/52042 600/438 |
| 2014/0148699 | A1* | 5/2014 | Shim | A61B 8/488 600/443 |
| 2015/0164477 | A1* | 6/2015 | Ryu | A61B 8/56 600/443 |
| 2016/0066893 | A1* | 3/2016 | Cho | A61B 8/54 600/459 |
| 2016/0278739 | A1* | 9/2016 | Pelissier | G01S 7/52082 |
| 2017/0035390 | A1* | 2/2017 | Ryu | A61B 8/54 |
| 2017/0086798 | A1* | 3/2017 | Bjaerum | A61B 8/565 |
| 2017/0128046 | A1* | 5/2017 | Kim | A61B 8/463 |
| 2019/0008486 | A1* | 1/2019 | Jin | A61B 8/4444 |

OTHER PUBLICATIONS

Search Report in United Kingdom Appln. No. GB2017816.6, dated Jul. 22, 2021, 5 pages.
International Preliminary Report on Patentability in International Appln. No. PCT/EP2021/081360, mailed on May 25, 2023, 12 pages.

* cited by examiner

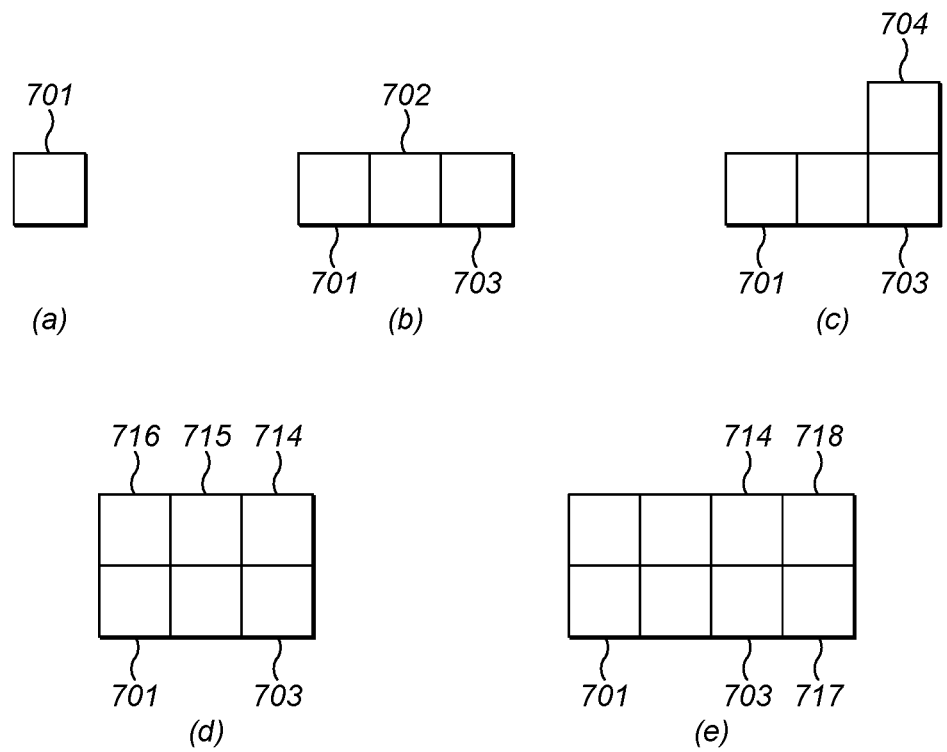
FIG. 7a-e
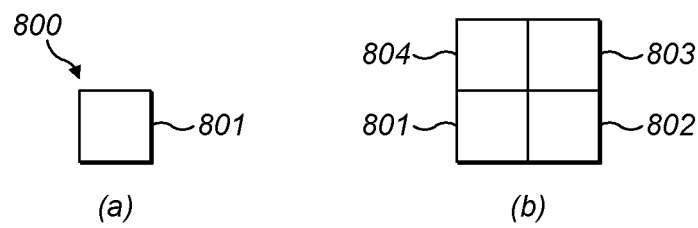
FIG. 8a-b

ULTRASOUND SCANNING SYSTEM

CROSS-REFERENCE TO RELATED APPLICATIONS

The present application is the national stage entry of International Patent Application No. PCT/EP2021/081360, filed on Nov. 11, 2021, and claims priority to Application No. GB2017816.6, filed on Nov. 11, 2020, the disclosures of which are incorporated herein by reference thereto.

FIELD OF THE INVENTION

This invention relates to an ultrasound scanning system for imaging structural features below the surface of an object.

BACKGROUND

A scanning system typically includes a transducer module. The transducer module is for imaging an object, for instance for imaging structural features below an object's surface. The transducer module may be particularly useful for imaging sub-surface material defects such as delamination, debonding and flaking.

Ultrasound can be used to identify particular structural features in an object. For example, ultrasound may be used for non-destructive testing by detecting the size and position of flaws in a sample. There are a wide range of applications that can benefit from non-destructive testing, covering different materials, sample depths and types of structural feature, such as different layers in a laminate structure, impact damage, boreholes etc. Ultrasound is an oscillating sound pressure wave that can be used to detect objects and measure distances. A transmitted sound wave is reflected and refracted as it encounters materials with different acoustic impedance properties. If these reflections and refractions are detected and analysed, the resulting data can be used to describe the environment through which the sound wave travelled. It is desirable to increase the flexibility of subsequent analysis of that data.

SUMMARY

According to an aspect of the present invention, there is provided a scanning system for imaging structural features below the surface of an object, the scanning system comprising:
  a transducer module configured to transmit ultrasound signals towards an object and to receive ultrasound signals reflected from the object whereby data pertaining to an internal structure of the object can be obtained, the transducer module being configured to transmit and receive ultrasound signals for each of a first frame and a subsequent second frame in an ultrasound scan comprising the first and second frames;
  an image generation module configured to generate image data representative of the object based on the received ultrasound signals; and
  a communication module for communicating with a remote device, the communication module being configured to send, to the remote device:
    a set of received ultrasound signals based on ultrasound signals received during the first frame of the scan, and
    image data generated based on ultrasound signals received during the second frame of the scan.

The set of received ultrasound signals may comprise at least a subset of all the received ultrasound signals. The set of received ultrasound signals may comprise amplitude data and/or time-of-flight data. The image data may comprise one or more of an A-scan image, a B-scan image and a C-scan image.

The scanning system may comprise a storage medium configured to store at least transiently the received ultrasound signals and/or the image data. The communication module may be configured to send the set of received ultrasound signals in response to a data transfer signal indicating that the set of received ultrasound signals is to be transferred to the remote device. The data transfer signal may be indicative of one or more of a feature in the received ultrasound signals, a relative location of the transducer module, a time signal, and a speed of movement of the transducer module. The feature may be identified based on the received ultrasound signals being representative of one or more of: a change in a backwall of the object; a change in a measure of corrosion of the object; a change in a measure of porosity of the object; delamination in the object; a crack in the object; and a void in the object. The scanning system may comprise an analysis module configured to identify the feature in the received ultrasound signals.

The set of received ultrasound signals may relate to a selected region of the object. The analysis module may be configured to identify the selected region of the object. The selected region may be selectable based at least in part on one or more of a measure of corrosion, a measure of porosity, a time-of-flight value or range of time-of-flight values, a standard deviation of values within the region, a variance of values within the region, and an average of values within the region. The selected region may be discontinuous within the object.

The communication module may be configured to send to the remote device the image data during and/or following the second frame. The communication module may be configured to send to the remote device the set of received ultrasound signals during and/or following the first frame. The communication module may be configured to send to the remote device at least a portion of the set of received ultrasound signals concurrently with at least a portion of the image data.

The received ultrasound signals may be binned into bins according to the location at which those received ultrasound signals were obtained and/or a time at which those received ultrasound signals were obtained. Data in the bins into which the received ultrasound signals are binned may represent an average of the binned received ultrasound signals. Data in the bins into which the received ultrasound signals are binned may represent a weighted average of the binned received ultrasound signals, where each binned data value is weighted in dependence on a signal-to-noise ratio of that data value. Data in the bins into which the received ultrasound data are binned may represent a weighted and/or scaled average of the binned received ultrasound signals, where each binned data value may be weighted and/or scaled in dependence on a characteristic of the transducer element from which that data value was obtained.

Ultrasound signals may be weighted and/or scaled in dependence on the transducer element from which those ultrasound signals were obtained.

The received ultrasound signals may be stored in a tile map, where the dimensions of the tile map may be modifiable as the transducer moves relative to the object.

According to another aspect of the present invention, there is provided a method of imaging structural features below the surface of an object, the method comprising:

transmitting ultrasound signals towards an object and receiving ultrasound signals reflected from the object whereby data pertaining to an internal structure of the object can be obtained, the transducer module being configured to transmit and receive ultrasound signals for each of a first frame and a subsequent second frame in an ultrasound scan comprising the first and second frames;

generating image data representative of the object based on the received ultrasound signals; and sending to a remote device:

a set of received ultrasound signals based on ultrasound signals received during the first frame of the scan, and image data generated based on ultrasound signals received during the second frame of the scan.

According to another aspect of the present invention, there is provided an ultrasound analysis system for analysing ultrasound signals received from a scanning system, the scanning system comprising a transducer module configured to transmit and receive ultrasound signals for each of a plurality of frames in an ultrasound scan, the ultrasound analysis system comprising:

a receiver configured to receive for at least one of a plurality of frames in the scan, from the scanning system, a set of ultrasound signals representative of an internal structure of an imaged object, and an image generation module configured to generate image data representative of the internal structure of the imaged object based on the received set of ultrasound signals.

The method may comprise modifying the settings used to generate the image data.

According to another aspect of the present invention, there is provided an ultrasound analysis system for analysing ultrasound signals received from a scanning system, the scanning system comprising a transducer module configured to transmit and receive ultrasound signals for each of a plurality of frames in an ultrasound scan, the ultrasound analysis system comprising:

a receiver configured to receive for each of the plurality of frames in the scan, from the scanning system, a set of ultrasound signals representative of an internal structure of an imaged object, and a processor configured to stitch together data representative of the internal structure of the imaged object based on the received sets of ultrasound signals.

The scanning system may be as described herein.

The data representative of the internal structure of the imaged object may comprise one or more of image data received from the scanning system and at least a portion of respective sets of ultrasound signals.

Any one or more feature of any aspect above may be combined with any other aspect. These have not been written out in full here merely for the sake of brevity.

BRIEF DESCRIPTION OF THE DRAWINGS

The present invention will now be described by way of example with reference to the accompanying drawings. In the drawings:

FIGS. 7a, 7b, 7c, 7d, and 7e show examples of a tile map;

FIGS. 8a and 8b show other examples of a tile map; and

DETAILED DESCRIPTION

Figure 1:
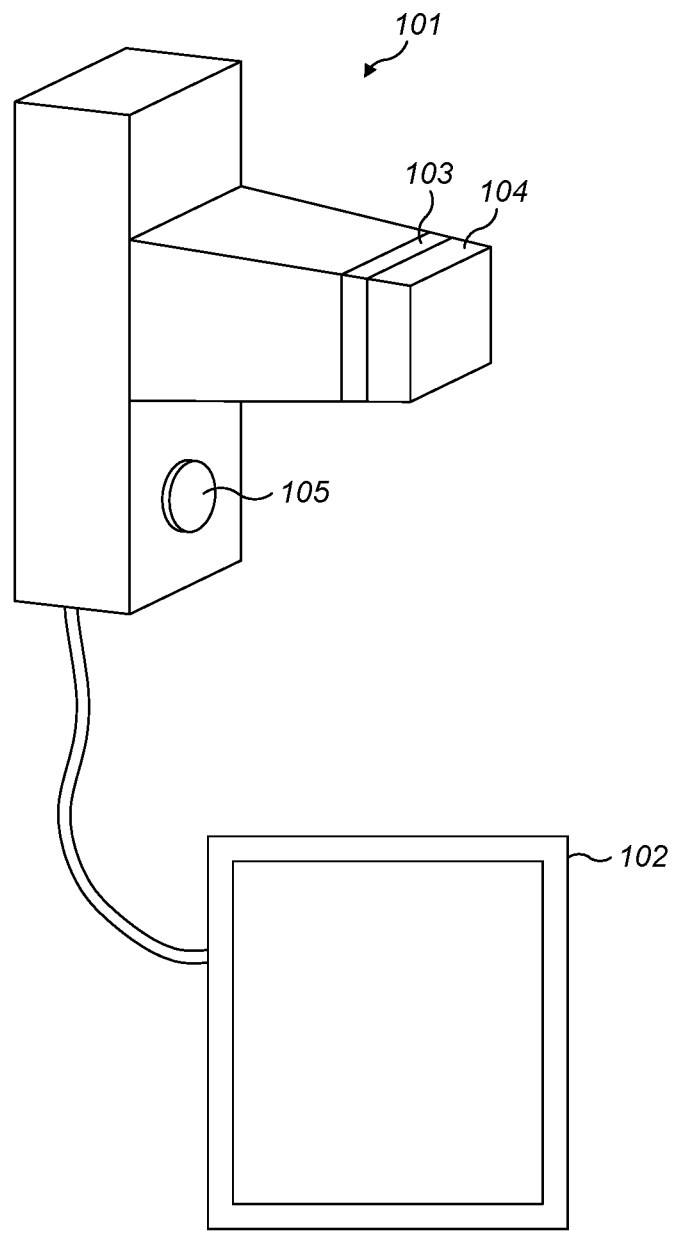
FIG. 1 shows a device for imaging an object.

Typically during an ultrasound scan, 2D images are generated based on captured 3D data, and those 2D images are transferred 'live' to a remote device for viewing or storage. There are inherent limitations when dealing with such 2D image data, including the inability to modify the settings used to generate those images.

In accordance with the present techniques, 3D data obtained during a scan, or a subset thereof, can be transferred from the scanning system to a remote device, together with the 2D images. This enables a much greater flexibility in subsequent processing of that data, particularly when that processing is performed much later, when it is not possible to re-scan the object. The present techniques enable the transfer of this 3D data whilst maintaining the 'live' transfer of 2D data, thus greatly enhancing the scanning and analysis capabilities available to ultrasound operators.

A scanning system typically gathers information about structural features located different depths below the surface of an object. One way of obtaining this information is to transmit sound pulses at the object and detect any reflections. It is helpful to generate an image depicting the gathered information so that a human operator can recognise and evaluate the size, shape and depth of any structural flaws below the object's surface. This is a vital activity for many industrial applications where sub-surface structural flaws can be dangerous. An example is aircraft maintenance.

Ultrasound transducers make use of a piezoelectric material, which is driven by electrical signals to cause the piezoelectric material to vibrate, generating the ultrasound signal. Conversely, when a sound signal is received, it causes the piezoelectric material to vibrate, generating electrical signals which can be detected.

The ultrasound signals received by the transducer relate to a 3D volume of the object being scanned. A transducer may be an array transducer, comprising an array of transducer elements. In the examples discussed herein, the transducer is a square array, but in other implementations the array can be of any desired shape and size. The transducer array can comprise 128 elements in two orthogonal directions, forming a 128*128 array having a total of 16,384 elements. The 2D array images along a depth direction into the object, thus forming 3D data. A scan obtained with the scanning system suitably comprises a series of shots or frames, each taken with the ultrasound transducer. Suitably the scan will be performed at a rate of between 10 and 30 Hz, i.e. such that there are between 10 and 30 frames per second in the scan. These frame rates are typical frame rates. Frame rates may be higher or lower than these. The transducer can move relative to the object being scanned between each frame, but it need not.

The depth scan of each transducer element produces a series of A-scans (one for each transducer element per scan frame). A-scan data from elements along a row or column of the transducer array can be used to produce B-scans, typically showing a slice through the object being scanned. A C-scan, typically showing a planar representation of the object, can be produced based on the 3D data, or a subset thereof.

The 3D data can be analysed, for example based on amplitude and time-of-flight, to generate 2D image data representative of the 3D data. The 2D data is representative of the subsurface structure of the object being scanned. The 3D data (the received ultrasound signals) can be used to generate images showing representations of the A-scans, B-scans and C-scans. Thus, the 3D data is suitably used to generate A-scan image(s), B-scan image(s) and C-scan image(s). The images, or image data, can be transferred and/or stored, for example for viewing by an operator. The image data is smaller in size than the 3D data (the received ultrasound signals) and so can be transferred live, as a scan is taking place, with an acceptable frame rate. An example frame rate may be at least 1 Hz, at least 10 Hz, at least 20 Hz, or more preferably at least 30 Hz. The frame rate can be up to 50 Hz, or up to 60 Hz, or up to 70 Hz. Suitably, the frame rate is between 1 Hz and 30 Hz, or between 10 Hz and 30 Hz, or more preferably between 20 Hz and 30 Hz.

Transferring the full set of received ultrasound signals can take a significant amount of time. It typically takes longer to transfer the full set of received ultrasound signals than it takes to perform the scan and receive those signals. Where the frame rate is, for example, 30 Hz, it will take 0.033 seconds to scan through the 128*128 elements. However, it is likely to take more than 0.033 seconds to transfer the full set of received ultrasound signals for the whole of the 128*128 array of elements. Thus, for typical frame rates, the full set of received ultrasound signals cannot be transferred live. Typically, the 3D data will be stored in a transducer buffer, but will not be transferred remotely from the transducer. The image data can be generated at the transducer module, and that image data transferred remotely, for example for viewing by an operator or storing.

The settings of the scanning system can be changed by an operator to optimise the data obtained. This optimised 3D data can be used to generate the A-scan image(s), B-scan image(s) and or C-scan image(s). However, once the images have been generated, the images cannot later be modified. That is, the settings used to generate the images cannot be modified based on the image data. The underlying 3D data is not included in the image data.

As the scan progresses, a C-scan image can be generated for each frame of the scan. As the transducer module moves across an object being scanned, the C-scans will relate to different lateral locations of the object. The C-scans can be stitched together, to form a larger C-scan image. Typically, this stitching is carried out based on a known location at which the C-scan images were obtained, for example where using a grid tool to position the transducer module at known locations before conducting the scan. The stitching can be carried out based on features in the C-scan images themselves, for example by lining up characteristic features in the C-scan images.

Whilst it is not possible to transfer full 3D data as the scan progresses, it is possible to transfer full 3D data relating to the final frame of a scan. This process can be termed full matrix capture (FMC), i.e. data from the full matrix of transducer elements is captured. The full set of 3D data can be sent following the final frame of the scan. The data transfer will still take a significant time, but since the scan has ended, this data transfer does not interfere with any subsequent data capture, or transfer of data such as image data from that subsequent data capture. Since the full set of 3D data is transferred for this final frame of the scan, the settings used to generate the various A-, B- and/or C-scan images can be modified so as to generate different images based on the set of 3D data.

A description of the scanning system in accordance with the present techniques is described with reference to the figures.

An example of a handheld device, such as a scanning system described herein, for imaging below the surface of an object is shown in FIG. 1. The device 101 could have an integrated display, but in this example it outputs images to a tablet computer 102. The connection with the tablet could be wired, as shown, or wireless. The device has a matrix array 103 for transmitting and receiving ultrasound signals. Suitably the array is implemented by an ultrasound transducer comprising a plurality of electrodes arranged in an intersecting pattern to form an array of transducer elements. The transducer elements may be switched between transmitting and receiving. The handheld apparatus as illustrated comprises a coupling layer such as a dry coupling layer 104 for coupling ultrasound signals into the object. The coupling layer also delays the ultrasound signals to allow time for the transducers to switch from transmitting to receiving. The coupling layer need not be provided in all examples. The scanning system can comprise a coupling shoe attached to the front of the transducer. The coupling shoe can act as a delay line, optionally in combination with the dry coupling.

The matrix array 103 is two dimensional so there is no need to move it across the object to obtain an image. A typical matrix array might be approximately 30 mm by 30 mm but the size and shape of the matrix array can be varied to suit the application. The device may be straightforwardly held against the object by an operator. Commonly the operator will already have a good idea of where the object might have sub-surface flaws or material defects; for example, a component may have suffered an impact or may comprise one or more drill or rivet holes that could cause stress concentrations. The device suitably processes the reflected pulses in real time so the operator can simply place the device on any area of interest.

The handheld device also comprises a dial 105 or other user input device that the operator can use to change the pulse shape and corresponding filter. In other examples the dial need not be provided. Selection of the pulse shape and/or filter can be made in software. The most appropriate pulse shape may depend on the type of structural feature being imaged and where it is located in the object. The operator can view the object at different depths by manually adjusting the time-gating via the display. Having the apparatus output to a handheld display, such as the tablet 102, or to an integrated display, is advantageous because the operator can readily move the transducer over the object, or change the settings of the apparatus, depending on what is seen on the display and get instantaneous results. In other arrangements, the operator might have to walk between a non-handheld display (such as a PC) and the object to keep rescanning it every time a new setting or location on the object is to be tested.

Figure 2:
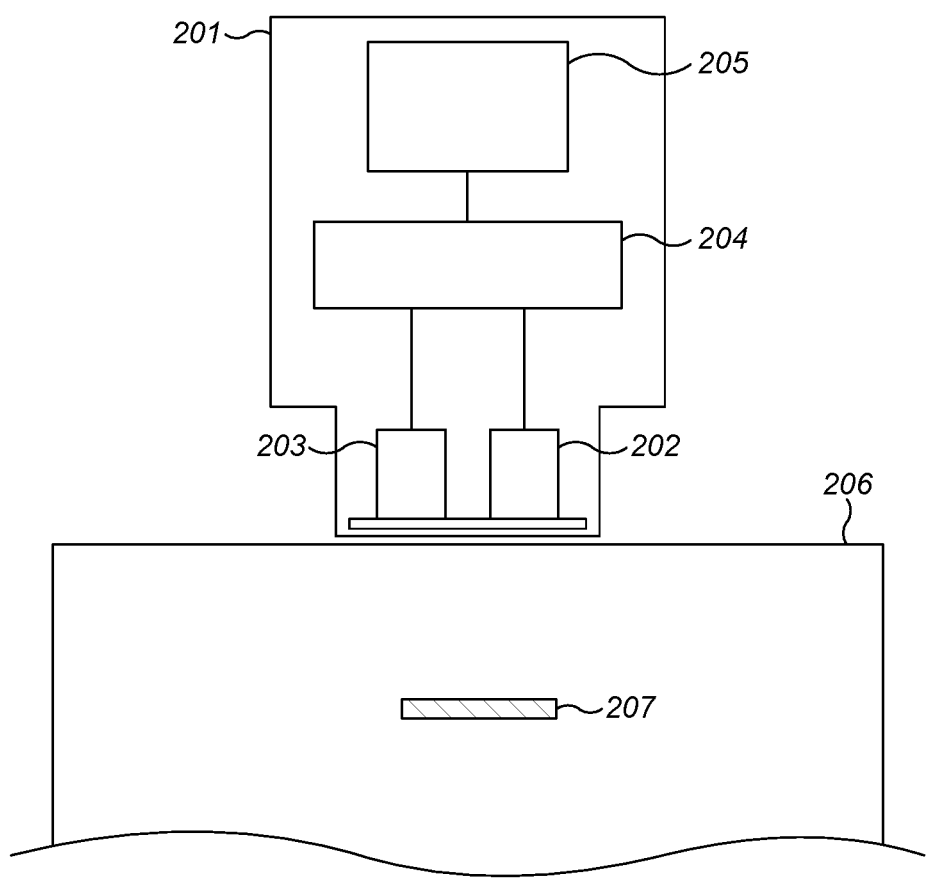
FIG. 2 shows an example of a scanning system and an object.

A scanning system for imaging structural features below the surface of an object is shown in FIG. 2. The apparatus, shown generally at 201, comprises a transmitter 202, a receiver 203, a signal processor 204 and an image generator 205. In some examples the transmitter and receiver may be implemented by an ultrasound transducer. The transmitter and receiver are shown next to each other in FIG. 2 for ease of illustration only. The transmitter 202 is suitably configured to transmit a sound pulse having a particular shape at the object to be imaged 206. The receiver 203 is suitably configured to receive reflections of transmitted sound pulses from the object. A sub-surface feature of the object is illustrated at 207.

Figure 3:
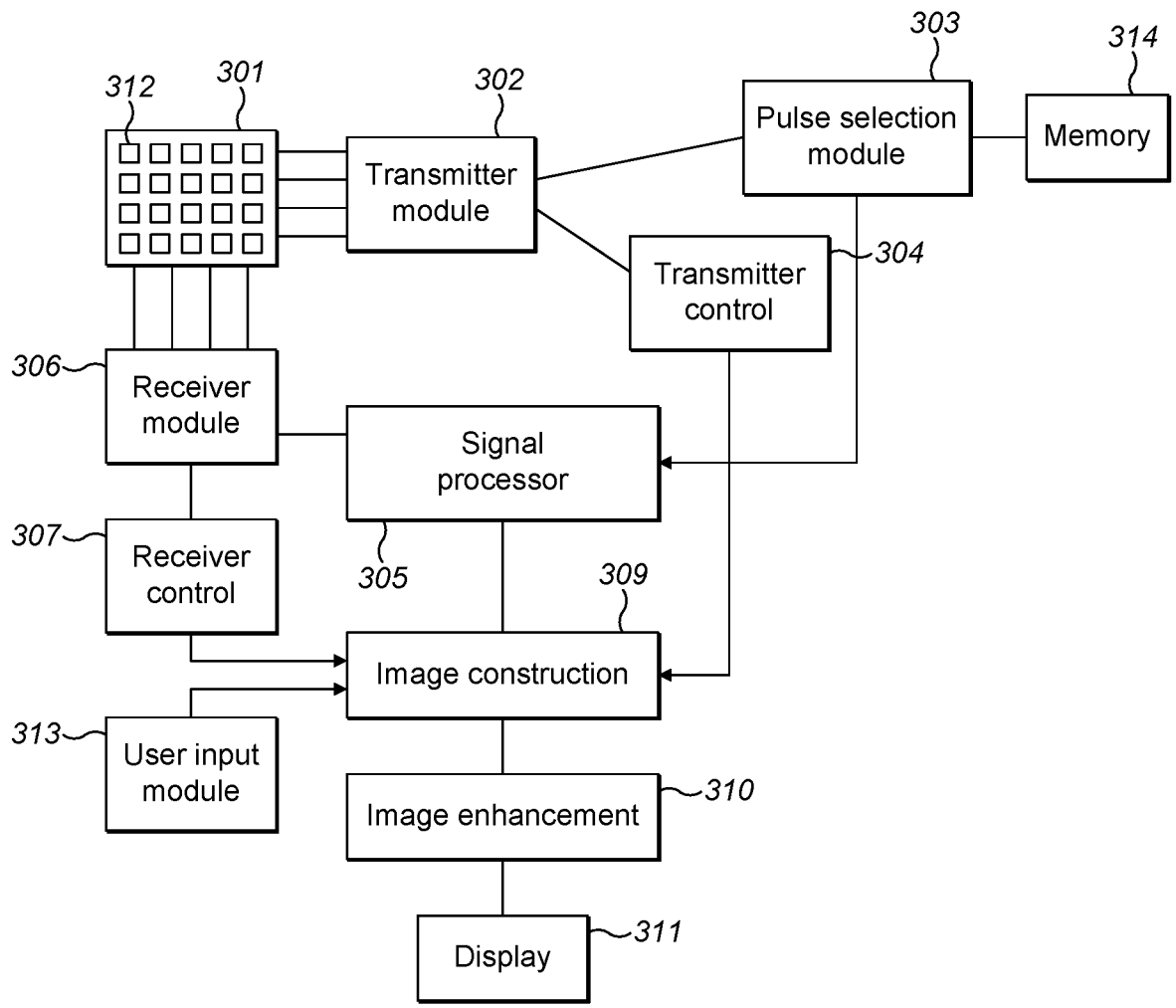
FIG. 3 shows an example of the functional blocks of a scanning system.

An example of the functional blocks comprised in one embodiment of the apparatus are shown in FIG. 3. In this example the transmitter and receiver are implemented by an ultrasound transducer 301, which comprises a matrix array of transducer elements 312. The transducer elements transmit and/or receive ultrasound waves. The matrix array may comprise a number of parallel, elongated electrodes arranged in an intersecting pattern; the intersections form the transducer elements. The transmitter electrodes are connected to the transmitter module 302, which supplies a pulse pattern with a particular shape to a particular electrode. The transmitter control 304 selects the transmitter electrodes to be activated. The number of transmitter electrodes that are activated at a given time instant may be varied. The transmitter electrodes may be activated in turn, either individually or in groups. Suitably the transmitter control causes the transmitter electrodes to transmit a series of sound pulses into the object, enabling the generated image to be continuously updated. The transmitter electrodes may also be controlled to transmit the pulses using a particular frequency. The frequency may be between 100 kHz and 30 MHz, preferably it is between 0.5 MHz and 15 MHz and most preferably it is between 0.5 MHz and 10 MHz.

The receiver electrodes sense sound waves that are emitted from the object. These sound waves are reflections of the sound pulses that were transmitted into the object. The receiver module receives and amplifies these signals. The signals are sampled by an analogue-to-digital converter. The receiver control suitably controls the receiver electrodes to receive after the transmitter electrodes have transmitted. The apparatus may alternately transmit and receive. In one embodiment the electrodes may be capable of both transmitting and receiving, in which case the receiver and transmitter controls will switch the electrodes between their transmit and receive states. There is preferably some delay between the sound pulses being transmitted and their reflections being received at the apparatus. The apparatus may include a coupling layer (such as the dry coupling and/or as provided by the coupling shoe) to provide the delay needed for the electrodes to be switched from transmitting to receiving. Any delay may be compensated for when the relative depths are calculated. The coupling layer preferably provides low damping of the transmitted sound waves.

Each transducer element may correspond to a pixel in the image. In other words, each pixel may represent the signal received at one of the transducer elements. This need not be a one-to-one correspondence. A single transducer element may correspond to more than one pixel and vice-versa. Each image may represent the signals received from one pulse. It should be understood that "one" pulse will usually be transmitted by many different transducer elements. These versions of the "one" pulse might also be transmitted at different times, e.g. the matrix array could be configured to activate a "wave" of transducer elements by activating each line of the array in turn. This collection of transmitted pulses can still be considered to represent "one" pulse, however, as it is the reflections of that pulse that are used to generate a single image of the sample. The same is true of every pulse in a series of pulses used to generate a video stream of images of the sample.

The pulse selection module 303 selects the particular pulse shape to be transmitted. It may comprise a pulse generator, which supplies the transmitter module with an electronic pulse pattern that will be converted into ultrasonic pulses by the transducer. The pulse selection module may have access to a plurality of predefined pulse shapes stored in a memory 314. The pulse selection module may select the pulse shape to be transmitted automatically or based on user input. The shape of the pulse may be selected in dependence on the type of structural feature being imaged, its depth, material type etc. In general the pulse shape should be selected to optimise the information that can be gathered by the signal processor 305 and/or improved by the image enhancement module 310 in order to provide the operator with a quality image of the object.

Figure 4:
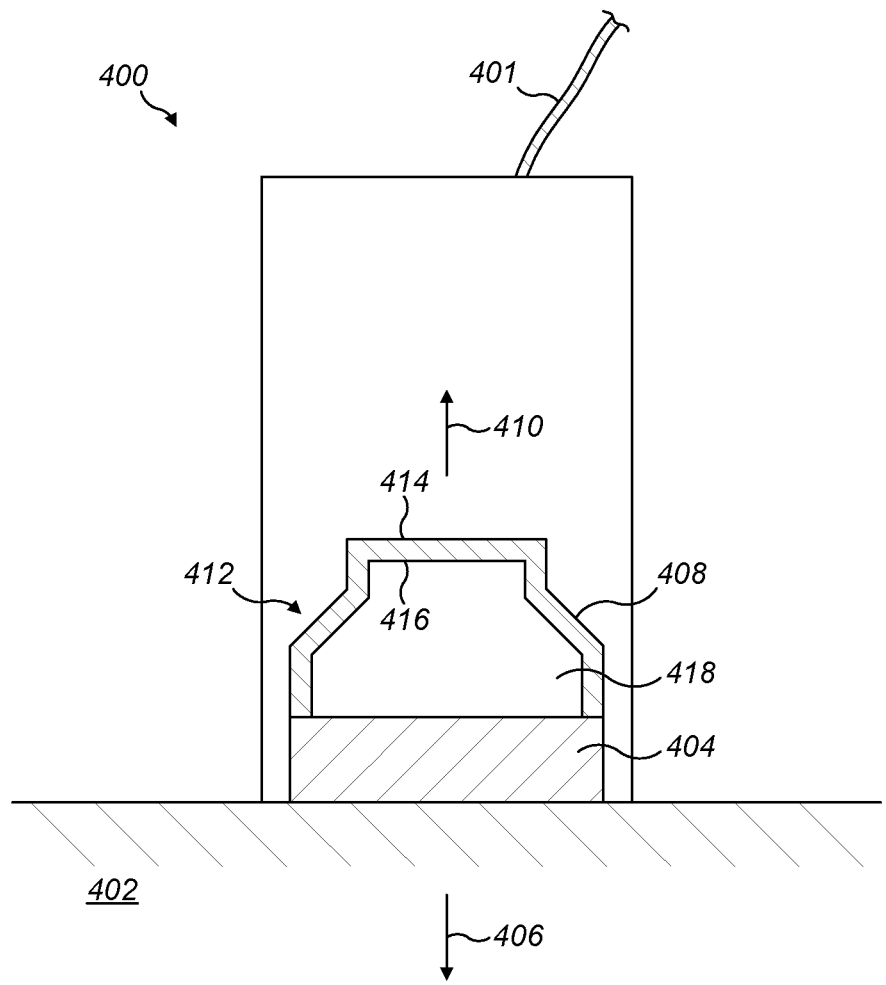
FIG. 4 shows a schematic illustration of a transducer module.

FIG. 4 schematically illustrates a transducer module. The transducer module (TRM) is generally indicated at 400. An electrical connection such as a cable 401 couples the TRM to a remote system. The remote system can provide driving signals and can receive detected signals. The transducer module is shown as being placed against an object under test 402. The TRM comprises a transducer 404. The transducer 404 comprises a transmitter. The transducer comprises a receiver. The transmitter and receiver may be separately provided. Details of the transducer structure and its electrical connections are omitted from this figure for clarity. The transducer is configured to transmit ultrasound signals towards the object to be imaged. The transducer is suitably configured to transmit ultrasound signals in a direction indicated at 406.

Figure 5:
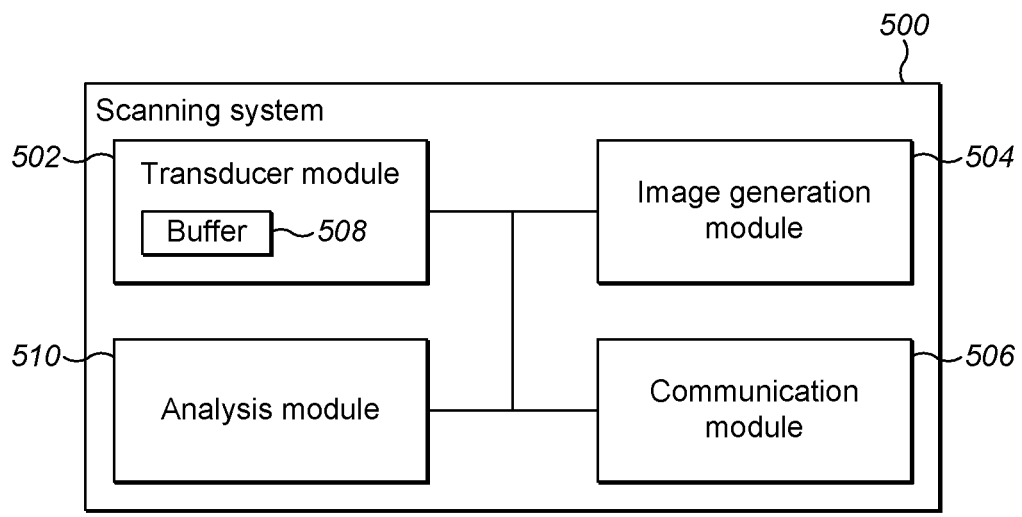
FIG. 5 shows a schematic illustration of a scanning system.

An example of a scanning system 500 for imaging structural features below the surface of an object is illustrated in FIG. 5. The scanning system comprises a transducer module 502, an image generation module 504 and a communication module 506. The communication module can comprise a communication port. The transducer module is configured to transmit ultrasound signals towards an object and to receive ultrasound signals reflected from the object whereby data pertaining to an internal structure of the object can be obtained. The transducer module is suitably configured to transmit and receive ultrasound signals for each of a first frame and a subsequent second frame in an ultrasound scan comprising the first and second frames. The image generation module is configured to generate image data representative of the object based on the received ultrasound signals. The communication module is for communicating with a remote device. The communication module is configured to send, to the remote device, a set of received ultrasound signals based on ultrasound signals received during the first frame of the scan. The communication module is also configured to send, to the remote device, image data generated based on ultrasound signals received during the second frame of the scan.

In this way, the set of received ultrasound signals (the 3D data) sent by the communication module is sent during the scan. That is, the scan can continue for at least one frame after the set of received ultrasound signals has been sent. Subsequent to sending the set of received ultrasound signals, the communication module sends 2D image data, e.g. relating to a frame of the scan after the frame to which the 3D data relates.

The set of received ultrasound signals can comprise at least a subset of all the received ultrasound signals. The set of received ultrasound signals suitably comprises amplitude data and/or time-of-flight data. The set of received ultrasound signals can comprise all of the received ultrasound signals. The received ultrasound signals may be at least partially processed to obtain the set of received ultrasound signals. The received ultrasound signals can be clipped at upper and/or lower and/or intermediate boundaries to form the set of received ultrasound signals. The boundaries can relate to one or more of amplitude, time-of-flight, and location relative to the array as a whole or the object being scanned. Thus the set of received ultrasound signals can relate to a selected depth or depth range within the object and/or those signals received within a selected area of the object's surface.

The image data sent by the communication module can comprise a set of image data. The set of image data can comprise at least a portion of the generated image data. Preferably, the set of image data comprises all of the generated image data. The generated image data can comprise one or more of an A-scan image, a B-scan image and a C-scan image.

Where a set of A-scan images are formed in dependence on the received ultrasound signals, the set of image data can comprise that whole set of A-scan images. Where a set of B-scan images is formed in dependence on the received ultrasound signals, the set of image data can comprise that whole set of B-scan images. Where both the set of A-scan images and the set of B-scan images are formed, the set of image data suitably comprises both the set of A-scan images and the set of B-scan images.

Similarly, where the image generator generates a set of A-scan images, a set of B-scan images and a set of C-scan images, the set of image data suitably comprises the set of A-scan images, the set of B-scan images and the set of C-scan images. For example, where a transducer module has a transmitter and receiver array of 128*128 elements, the received ultrasound signals for a frame of a scan comprising multiple frames will comprise A-scan data for each of the elements (i.e. 16,384 A-scans), B-scan data for each row and column of elements (i.e. 256 B-scans) and C-scan data for the whole frame (i.e. a single C-scan, though multiple C-scans can be formed from the C-scan data). From this data, the image generator can generate 16,384 A-scan images, 256 B-scan images and at least one C-scan image.

In transferring the set of image data, the communication module can transfer one or more A-scan images. In transferring the set of image data, the communication module can transfer one or more B-scan images. In transferring the set of image data, the communication module can transfer one or more C-scan images. Suitably, the B-scan image(s) can be formed in dependence on multiple ones of the A-scan images. The C-scan image(s) may be formed in dependence on multiple ones of A-scan images and/or B-scan images. At least some of the A-scan image(s), the B-scan image(s) and the C-scan image(s) may be formed from the received ultrasound signals or a subset thereof.

It is possible to up-sample data before generating a C-scan image. The up-sampled data need not be stored. The up-sampled data can be discarded after image generation. The original data can be stored, enabling up-sampling to be performed again later if needed.

The scanning system 500 comprises a storage medium 508 configured to store (at least transiently) the received ultrasound signals and/or the generated image data. Suitably the storage medium comprises a buffer. The storage medium is accessible to the transducer module. The storage medium can conveniently be located at the transducer module. The storage medium is coupled to the image generation module. Where the storage medium is not provided at the transducer module, the storage medium can be coupled to the transducer module.

Suitably, the scanning system is configured to send, as part of the set of received ultrasound signals, data representing one or more B-scans. For example, the set of received ultrasound signals can comprise the received ultrasound signals from which B-scans can be formed for a certain number of rows and/or columns of the transducer array, such as single row and/or column. Where a single row and/or column worth of data is sent as part of the set of received ultrasound signals, the particular row and/or column can be selected based on a feature of interest (see discussion elsewhere herein) or based on an indicator on a display, the position of the indicator being controllable by an operator. For a square array of 128*128 elements, transferring data for a single row and column can comprise transferring 255 sets of A-scan data (i.e. for 128 elements in one of the row and column and 127 elements in the other of the row and column, to avoid sending the same A-scan data twice for the element that is in both the row and column).

The B-scan data can suitably be transferred without impacting the transfer of the image data. That is, the bandwidth of the communication channel is sufficient for the set of received ultrasound data to be transferred together with the image data for one or more frames subsequent to the frame in which the B-scan data is obtained.

Over time, a set of B-scan data transferred as part of the set of received ultrasound signals can be built up. This B-scan data need not be in respect of every distinct location across the object. The B-scan data can relate to spaced locations across the object. Nonetheless, the set of B-scan data can provide a map of FMC data for a given area or part of an area, without needing to transfer all the FMC data at once. Thus, this approach is useful in real-time imaging and data transfer.

The set of B-scan data is suitably captured from or relates to a portion of the 128*128 array across the extent of the array in one direction and partially across the extent of the array in an orthogonal direction. For example, the set of B-scan data can be captured from a 128*10 portion of the array. That is, a portion of the array that is 128 elements by 10 elements. The 128*10 portion of the array is suitably the 'leading' portion of the array. In other words, where the transducer is being moved to the right, the 10 columns of elements at the right-hand side of the array form the 128*10 portion.

The frame rate used to scan an object can be determined based on the size of the portion of the array used to capture the set of B-scan data. Where it is possible to transfer data captured from a portion of the array (e.g. a 128*10 portion) in 0.1 seconds, a frame rate of Hz can be selected. Practically, a frame rate of slightly less than this might be chosen, such that there remains bandwidth to transfer image data at the same time as transferring the B-scan data. Thus, the calculated frame rate can be taken as an upper limit on the frame rate.

Selecting a portion of the array in this way usefully provides FMC data for that portion of the array. Typically, the transducer module will move at a speed which is sufficiently low that it moves by a distance equal to or less than the width of the portion of the array between each frame captured in the scan. That is, where the portion of the array is a 128*10 portion, and the frame rate is 10 Hz, the transducer module can be moved by a distance equivalent to or less than the width of 10 columns in 0.1 seconds.

This approach means that FMC data for each part of the object is sent to, and therefore available at, the remote device. Thus, over the scan, an entire set of FMC data can be built up in respect of the volume of the object scanned during the scan.

The FMC data available at the remote device enables the settings used to generate the image date to be changed after the scan has finished. During a scan, image data is generated at the scanning system, and that image data transferred to the remote device. The settings, such as time-gating and threshold amplitudes and so on, cannot be changed later based on the transferred image data. This is because the full data is not included in the image data. Thus, an operator is not able to modify settings after the scan, based on the image data alone. However, in the present techniques, additional data is transferred to the remote device. The FMC data transferred enables the generation of image data at the remote device. As part of this image generation process, settings can be modified as desired. Thus, the settings can be modified after the scan has been completed. This greatly increases the usefulness of the scanning techniques, for example by enabling analysis at different depths (time-gates) within the scanned object, even when the scan of that object has finished.

Thus, B-scans and/or C-scans can be generated, based on the FMC data, at the remote device.

The communication module is suitably configured to send the set of received ultrasound signals, for example to the remote device, in response to a data transfer signal. The data transfer signal can indicate that the set of received ultrasound signals is to be transferred to the remote device. The data transfer signal is suitably indicative of one or more of a feature in the received ultrasound signals, a relative location of the transducer module, a time signal, and a speed of movement of the transducer module.

The relative location of the transducer module is suitably a location of the transducer module relative to the object. The relative location of the transducer module may be provided by a positioning system coupled to or forming part of the scanning system. For example, the positioning system can comprise a grid tool on which the transducer module is mountable. The grid tool can be configured to position the transducer module at a series of discrete positions. Locating the grid tool in fixed relative position to the object under test therefore permits the transducer module to move through the series of discrete positions relative to the object. The grid tool may be set up so that the transducer module is positionable using the grid tool at grid locations spaced 30 mm from one another in orthogonal directions. This grid spacing may be suitable for a transducer module having a transducer dimension of approximately 30 mm. A smaller transducer size may necessitate a smaller grid spacing to ensure complete coverage is achieved. Similarly, a larger grid spacing may be used for a larger transducer size. Suitably the grid size is slightly smaller than the transducer size, so that there is some overlap in scans obtained from adjacent grid positions. This overlap can assist in stitching multiple scan images or scan data together.

The positioning system can comprise a positional encoder. The positioning system suitably comprises an encoding wheel, or preferably at least two encoding wheels, where two of the at least two encoding wheels can be orthogonal to one another. The positioning system generates signals indicative of the position of the transducer relative to the object being scanned. These signals can be used to stitch ultrasound data or images generated from ultrasound data together.

Positioning systems, such as those given as examples above, may be inherently inaccurate, at least to some degree. For instance, an encoder wheel might slip on an object's surface, rather than rolling along it. This slippage will reduce the accuracy of the signals generated by the positioning system. Consequently, the stitching of ultrasound and image data will be less accurate. Analysis performed on such stitched data and/or images will correspondingly be less accurate as a result.

Typically, C-scan images are stitched together, for example at the remote device, based on the data in the 2D image. In accordance with the present techniques, C-scan images can be stitched together based at least in part on the set of received ultrasound signals. That is, the stitching can be based at least in part on the 3D data from which the C-scans have been obtained. This may be in addition to stitching the C-scans in dependence on the 2D C-scan image data.

The use of FMC data in the stitching process can lead to an increase in stitching accuracy. The FMC data can be used to stitch the separately captured sets of FMC data together. This can lead to efficient stitching of the data without glitches. Hence using the set of received ultrasound signals in the stitching process can improve the accuracy of the stitching (e.g. by accounting for inaccuracies in encoder positioning), and hence improve the accuracy of data analysis performed on the stitched image. Stitching the images can comprise assessing 2D image and/or 3D data movement, for example by making use of MPEG encoding to check translations between image or data sets.

Selecting an appropriate size for the portion of the array, based on desired frame rate and/or on the speed of transducer movement relative to the object being scanned, enables overlap in the sets of data such as the B-scan data, and so can enable accurate stitching of the data.

The scanning system is suitably configured to send the set of received ultrasound signals every n frames. Suitably, n>1. The scanning system may be configured to send the set of received ultrasound signals every y seconds. Suitably, y>(1/f), with f being the frame rate in Hz. The scanning system may be configured to send the set of received ultrasound signals every z mm across the scan. Suitably, z is greater than the separation, in mm, of adjacent lines of receiving elements in the transducer module. In some implementations, the frequency with which the set of received ultrasound signals is transferred is dependent on the relative velocity between the transducer module and the object being scanned. This approach permits a sufficient frequency of data transfer to occur such that there are no undesirable gaps in the captured data.

Suitably, the feature is identified based on the received ultrasound signals being representative of one or more of: a change in a backwall of the object; a change in a measure of corrosion of the object; a change in a measure of porosity of the object; delamination in the object; a crack in the object; and a void in the object.

In this way, the scanning system can transfer to the remote device the set of received ultrasound signals based on identification of a particular structural characteristic of the object. The structural characteristic can comprise a defect, for example an area of delamination of a laminate structure or a crack in a structure. Suitably, non-homogeneities are identifiable as part of the structural characteristic of the object.

The scanning system can transfer the set of received ultrasound signals in response to detecting in the received ultrasound signals the particular feature(s). This approach permits a more detailed set of data to be sent for later processing and analysis than the image data. This more detailed set of data is sent in response to detecting the feature, so can be data representative of that detected feature. This selectivity of data to be transferred helps save bandwidth and processing power, whilst ensuring that relevant data is transferred.

A change in the backwall of an object can be determined by detecting a change in the time-of-flight to a feature in the depth scan having an amplitude greater than a threshold backwall amplitude. The change in the backwall may be a step-change in the backwall. The change may be a change in amplitude in the backwall, indicating a change in the nature of the interface, and/or a change in the depth of the backwall, indicating a thickening or thinning of the backwall. A change above a threshold change can lead to the generation of the data transfer signal.

Measures of corrosion and/or porosity of a material can be determined by comparison with known materials. The measures of corrosion and/or porosity may therefore be relative measures, in that they can determine whether a material is more or less corroded, and/or has a greater or lesser porosity, than a reference material. Where the measure of corrosion and/or the measure of porosity differs from a predetermined measure, or a previous measure, by more than a threshold amount, the data transfer signal can be generated.

Defects, such as delamination, cracking, and the presence of voids and so on in the material can be determined by analysing the received ultrasound signals to detect signal profiles characteristic of such defects. On detection of a defect, or on detection of a defect above a threshold size, the data transfer signal can be generated.

The scanning system suitably comprises an analysis module 510 configured to identify the feature in the received ultrasound signals.

The analysis module can be coupled to the transducer module so as to access the received ultrasound signals. The analysis module is suitably configured to identify the feature based on an analysis of the received ultrasound signals. The analysis module can be configured to identify the feature in any convenient way. For example, the feature can be identified based on a comparison with a known signal profile. The known signal profile may be dependent on one or more of the transducer characteristics (including ultrasound frequency, shape and size), a material of the object, a depth of the feature, and so on. The feature may be identified based on a change in time-of-flight and/or amplitude. The feature may be based on a change in time-of-flight and/or amplitude above a threshold change value. The feature may be based on a change in time-of-flight and/or amplitude across a threshold lateral distance (for example a change above a threshold change that occurs within a threshold distance).

The set of received ultrasound signals can represent an entire frame captured by the ultrasound transducer, but, as introduced elsewhere herein, it need not. The set of received ultrasound signals may relate to a portion of the area of the ultrasound transducer. For example, where there is an overlap with an earlier frame, the data relating to the overlap area need not form part of the set of received ultrasound data. In this way, the data relating to that overlap area need not be transferred twice. Analysing the data in this way to selectively form the set of received ultrasound signals can increase the efficiency and/or speed with which the data relating to a frame is transferred.

Where an overlap exists, rather than transferring data relating to that area again, the data may be copied from a data storage location at or accessible to the remote device. Thus an entire frame of data may still be generated without necessitating the transfer of that entire frame of data. The overlap data may be stored in data storage, such as a tile map (discussed elsewhere herein), associated with the new frame. Alternatively, pointers to the data storage location of the overlap data relating to the old frame may be stored in a data storage location of the new frame.

The set of received ultrasound signals may comprise a selection of the received ultrasound signals. The selection may be based on signals received that relate to an area of interest (whether based on a location at which those signals were received, and/or based on a depth from which those signals were received). The selected areas may be discontinuous within a frame. The selected areas can be defined based at least in part on movement, velocity and/or location of the transducer module.

The selection of ultrasound signals of interest may be performed manually or automatically. A manual selection tool can comprise an indicator movable on an image representative of the object, such as an image of the set of image data. The indicator is suitably a mouse cursor on a screen on which the image is displayed. Alternatively, the indicator can be controlled by a touch input on a touch-sensitive display screen. The manual selection tool can be used to select an area such as a rectangle, a circle, a section of a circle, and so on. The display can display statistics for the selected area such as one or more of the mean, standard deviation, median and mode. Based on the displayed statistics, the area can be designated as an area of interest. More than one area may be drawn on the image. More than one area may be designated as an area of interest.

One or more regions of interest can be identified automatically. The regions of interest can be identified dynamically, e.g. as the scan is being performed. The regions of interest may be identified based on one or more of: a measure of corrosion, a measure of porosity, a time-of-flight value or range of time-of-flight values, a standard deviation of values within a region, a variance of values within a region, an average of values within a region, and so on.

During a scan, approximately 100 MB of data can be generated per frame. Scanning a pipe along a typical length can lead to over 1 TB of data in total. Thus approaches such as the above, where regions or areas can be selected and data for those selected regions/areas transferred rather than transferring all the data, can lead to significant decreases in total data that needs to be transferred. According to the present techniques, this can be achieved such that data of interest is selectively transferred, enabling subsequent analysis of the transferred data to include analysis of the regions/areas of interest. Thus, in one approach, data can be identified as being of interest according to a given metric or characteristic, and only that data need be transferred.

Further enhancements in data transfer efficiency can be provided by considering the resolution of the data. The resolution achievable in the received ultrasound signals can be dependent on factors including the bandwidth of the transmitted pulse, i.e. the frequency or frequency range of the transmitted pulse, the size of the transducer, the distance between the transducer and the object or feature of interest within the object, and so on. As an example, where the transmitted pulse is a 2 MHz pulse, i.e. a relatively low frequency, the pulse will, to some extent, be laterally spread out more than a pulse of higher frequency, i.e. the pulse will have a greater beam spread where the frequency is lower. This spreading of the beam will reduce the spatial resolution achievable. Thus, the number of distinct elements contributing to the received ultrasound signals can be reduced without affecting (or materially affecting) the resolution of the captured data.

Figure 6:
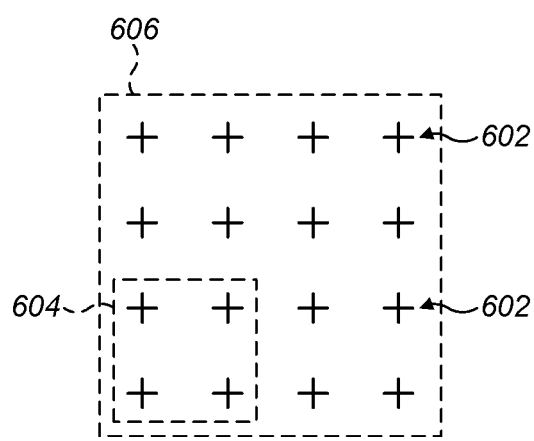
FIG. 6 shows a schematic grouping of transducer elements.

The number of distinct elements contributing to the received ultrasound signals can be reduced in multiple ways. One way is to capture data from a subset of the elements, such as every other element, or every third element. This can reduce the amount of data significantly. Another way is to group elements together. For example, elements can be grouped in groups of two or three, across a lateral direction of the transducer array. Where elements are grouped in groups of two laterally, the groups can be groups of four in 2D. That is, a 128*128 element array can be grouped so as to result in an effective array of 64*64 elements. This 'reduced' array may be further reduced to an effective array of 32*32 elements. This is schematically illustrated in FIG. 6, which shows individual transducer elements 602 grouped to a first level (in groups of four) 604 and grouped to a second level (in groups of 16) 606. Data from the grouped elements can be combined in any suitable way, for example by summing the data values from each element, or by averaging the data values from the different elements.

The communication module is suitably configured to send, e.g. to the remote device, the image data (e.g. relating to a given frame such as the second frame of a scan) during and/or following (or immediately following) the second frame. The communication module is suitably configured to send, e.g. to the remote device, the set of received ultrasound signals (e.g. relating to a particular frame such as the first frame) during and/or following the first frame.

Suitably, the communication module is configured to send, e.g. to the remote device, at least a portion of the set of received ultrasound signals (that can relate to a first frame) concurrently with at least a portion of the image data (that can relate to a second frame). The second frame is suitably subsequent to the first frame in a sequence of frames of the scan.

The received ultrasound signals can be binned into bins according to the location at which those received ultrasound signals were obtained and/or a time at which those received ultrasound signals were obtained.

The location at which the received ultrasound signals are obtained suitably refers to the location with respect to the object. Thus, a given bin will correspond to a given location with respect to an object. This approach enables binning data obtained from the same location with respect to the object in the same bin. Where the transducer module is moved over the object so as to re-scan one or more areas, such as might typically be expected to happen when 'painting' the object, binning the data can make use of subsequently obtained data to improve data quality, for example by averaging the later-obtained data with the earlier-obtained data.

The data in bins into which the received ultrasound signals are binned can represent an average of the binned data, such as the binned received ultrasound signals. Data in each bin can comprise an average such as the mean of the data values binned into that bin. Averaging the data will typically help improve the signal-to-noise ratio of the binned data.

Data in the bins into which the received ultrasound signals are binned can represent a weighted average of the binned data. Each data value can be weighted in dependence on a signal-to-noise ratio of that data value. The signal-to-noise value can be determined for each data value individually. The signal-to-noise value can be determined for a frame of a scan, e.g. across the whole transducer array for that frame.

Data in the bins into which the received ultrasound data are binned suitably represent a weighted and/or scaled average of the binned data. Each data value can be weighted and/or scaled in dependence on a characteristic of the transducer element from which that data value was obtained.

There are likely to be differences between transducer elements across the array of transducer elements. These differences may be inherent differences resulting from the manufacturing process. Such differences will lead to characteristics of one transducer element being different from the characteristics of another transducer element. The characteristics of the transducer elements of the array can be determined. Suitably the characteristics are determined in advance, for example by analysis of a scan of a known material.

Based on the known characteristics of the transducer elements, the data obtained from each transducer element can be weighted and/or scaled accordingly. The signals can, for example be scaled up or down depending on the characteristics of the transducer elements.

The bins into which the received ultrasound signals are binned can be provided at the scanning system and/or remote therefrom. That is, the data can be binned locally to the scanning system, for later processing. For example, the binned data can be transferred together to the remote device. This approach can reduce overall bandwidth relating to the transfer of the binned data. In some implementations, the received ultrasound signals are transferred, for example to the remote device, and binned at a memory at or accessible to that remote device. This approach can enable faster subsequent processing of the binned data and can enable intermediate processing of the data, rather than needing for the binning process to complete and for the binned data to then be transferred to the remote device for processing.

The binning of the data into the respective bins can be performed based on a position of the transducer module. Suitably the position is determined based on an output of a positional encoder such as an encoder wheel coupled to the transducer module. Processing overhead can be reduced where binning is carried out as data is obtained. This can avoid needing to separately store the data elsewhere then perform a separate binning step.

The received ultrasound signal data comprising the received ultrasound signals is suitably stored in a tile map, where the tile map comprises one or more tiles. Reference is made to FIG. 7 illustrating an example tile map 700. Each tile can correspond to the full transducer area, or a portion of the transducer area, for example a quarter of the transducer area. Preferably, each tile corresponds to the full transducer area. In this case, each tile is arranged to store data captured for each transducer element. In the example where the transducer has 128*128 elements, each tile is suitably able to accommodate data for all 16,384 elements. The tiles may be square, but need not be. The tiles are suitably square to correspond to a square transducer array. That is, the tile can be shaped to correspond to the shape of the transducer array. This correspondence enables a more efficient mapping between the transducer array and the tile, facilitating more efficient storage of data.

The tile map may be of a fixed size. This approach can be useful where the size of the object to be scanned (or the number of separate areas of the object to be scanned) is known in advance. The tile map can thus have allocated to it an amount of memory sufficient for each tile. This allocation in advance can help structure the tile map in memory in a way that enables efficient memory access for data storage and retrieval. For example, taking a simple example, data for a number of tiles can be stored in one memory page. Where a scan or raster pattern is known, the memory for each tile or group of tiles can be allocated in order of the scan. Thus, memory pages can be accessed sequentially, increasing memory access efficiency.

However, it is usual for the scan size not to be known in advance. For example, when scanning a part such as an aircraft wing, it is useful if the scanning system can be used to scan the wing in a more 'freeform' manner. The scan need not, therefore, correspond to a known scan pattern. The scan need not correspond to a regular scan pattern. That is, the transducer module can be moved relative to the part to be scanned in any desired direction, and to achieve any desired coverage of area. This approach can be termed 'painting' since it is akin to moving a paintbrush over a surface without requiring that the brush is moved in any preset pattern.

In this 'painting' approach, it is preferable if the tile map does not have a fixed size, but is permitted to grow dynamically as the scan progresses. As the tile map grows, more memory can be allocated to the tile map. This enables the tile map to be sized to as to accommodate sufficient data without needing to have an overly large amount of data pre-allocated to it.

The tile map is suitably allowed to grow dynamically in different directions. The tile map may initially comprise a single tile 701 (FIG. 7*a*). Of course, it will be understood that the tile map may comprise any number of initial tiles, and still be permitted to grow dynamically as needed. After obtaining data for that initial single tile, the transducer module may be moved to the right (the absolute direction is not critical; the relative direction here is used to illustrate the tile map growing in response to movement of the transducer module). The tile map can therefore grow by the addition of another single tile 702 to the right of the initial single tile. If the transducer module moves further to the right, another tile 703 can be added to the tile map to the right of the second tile, and so on (see FIG. 7*b*).

If the transducer module is then moved upwards, a single tile 704 can be added to the tile map above the previous tile (FIG. 7*c*). Continuing the example above, the transducer moves upwards from the third tile. A fourth tile is added to the tile map above the third tile. The tile map may continue to grow in this manner, with single tiles being added to the tile map in the direction in which the transducer module is moved.

In an alternative, the growth of the tile map need not be by just a single tile in each case. Rather, a new row or column of tiles can be added. The new row or column of tiles can have a dimension corresponding to the existing size of the tile map. Referring to the example in FIG. 7*b* again, where the transducer module is moved from the third tile upwards, a new row can be formed of the same size as the existing row. In this example, a new row of three tiles 714, 715, 716 can be added to the existing row of three tiles (FIG. 7*d*). This new row can be added whether the transducer module is moved upwards from any one of the first three tiles.

If the transducer module is them moved to the right from tile 716 in FIG. 7*d*, a new column can be added. The existing tile map comprises a 2×3 array of tiles. A new column is suitably added that corresponds in length to the existing columns. In this example, therefore, a new column of 2 tiles 717, 718 can be added, forming a new tile map of a 2×4 array (FIG. 7*e*).

Moving the transducer upwards from the uppermost tile in this new column will, following the same approach of the present example, lead to the addition of a new row of 4 tiles. Thus, the tile map will then comprise a 3×4 array of tiles. This process can be repeated to grow the tile map as needed.

Suitably the tiles are all of the same size. This is not necessary in all cases. Some of the tiles may have different sizes. The tiles may all have different sizes. There may be groups of sizes of tiles. Processing the tile map can be simplified where the tiles are all of the same size.

In the above example, the tile map grew dynamically by adding rows and columns as needed. Thus, the tile map can be an n×m array, where n and m can be different integers. It is preferable if the tile map remains square, as this can assist in simplifying processing. That is, it is preferable that the tile map is an n×n array.

In this case, for the tile map to remain square, it can initially comprise a square tile map 800 of length and width, n, where n≥1. As the tile map expands, tiles are added such that the resulting tile map remains square. Taking a simple example, where an initial tile map is a single square 801 (i.e. n=1, see FIG. 8*a*), on moving the transducer module to the right, rather than only adding a single tile to the right 802, two additional tiles 803, 804 are added. The resulting tile map then remains square (with n=2, see FIG. 8*b*). In the illustration, these additional tiles are added above the initial tile. In some cases, the additional tiles can be added below the initial tile. Likewise, where the transducer module moves to the left from an initial single tile, the two additional tiles can be added either above or below the initial tile. Similarly, where the transducer module moves upwards (or downwards) from an initial single tile, an additional two tiles can be added either to the left or to the right of the initial tile. The selection of which direction to add the tiles can be according to a default (e.g. up and to the right) or can be based on knowledge of earlier scans and how earlier tile maps have grown. The selection of the direction can be selectable, for example by a user. The direction can be relative to the object being scanned. The direction can be relative to an orientation of the transducer module.

The tile map can be permitted to be sparse. That is, there is no need for each tile in the tile map to comprise data. This will often be the case where the transducer module is used to 'paint' an object as some areas, corresponding to certain tiles, may not be scanned. The tile map may be non-sparse. For example, where a raster pattern (corresponding to the ultimate shape of the tile map) is followed, each tile of the tile map will suitably comprise data.

Each tile can suitably accommodate data from the whole transducer. That is, each tile can suitably accommodate data from each of the 16,384 elements in a 128×128 element array. The A-scan length may have a maximum of 2000 data values. Each data value may be represented by a 16-bit value. Thus, in this example, each tile suitably has a capacity of 128*128*2000*16 bits. Other tile capacities will be apparent where the transducer is of a different size, the A-scan has a different depth, or the data values are represented at a different data precision.

Data for the tile map can be stored in chunks of data. The chunks need not all be the same size. Preferably the chunks are all the same size. This simplifies processing. Suitably the chunks are sized so that the largest tile can be stored within a single chunk of data. A chunk of data can correspond to a data portion of size 128*128*2000*16 bits. If the whole chunk is not used, then there will be a certain amount of wasted space in the chunks. In an alternative, data can be allocated to different chunks, for example where chunks are differently sized and/or where a chunk is smaller than the size needed to store data for a tile. The allocation process will take up time, power and/or bandwidth. The present inventors have determined that it is efficient to choose an appropriate chunk size so that a tile's worth of data can be stored in a single chunk, rather than to expend processing effort in allocating data to chunks.

The storage of data in the tile map enables parallel processing of data in different tiles. Therefore, the use of the tile map can improve efficiencies in data storage, accessing and processing.

As discussed, data can be stored in the tile map so as to average data obtained in respect of the same location with respect to an object. An alternative is to store each set of data together with a time stamp indicative of a time at which that data was captured. In this way, each location on an object can have associated therewith a set of received ultrasound signals that were captured at a particular time.

In one approach, rather than adopt a location-based binning system, the binning system can be time-based (or some combination of location-based and time-based). For example, any data captured in a given time period can be binned together. Such binned data can be processed (e.g. averaged) as described with respect to the location-based binning of data. The time-period may be relatively short, such as 10 seconds, such that some averaging is performed to improve the signal-to-noise ratio within each time period, but that data is captured in different time periods within a scan without the whole scan time becoming unnecessarily long.

This approach can be useful where conditions may change during a scan. For example, the object being scanned may be under the action of a force. The force may cause cracks to form and/or grow. It can therefore be useful to be able to view data captured at different times to be able to analyse how the object or defects within the object responded to the force. Capturing such time-based data, enables modification of a time-base when creating images. This can permit analysis of the object at the selected point in time (or selected time period) as well as allowing analysis of the object at a selected location.

Figure 9:
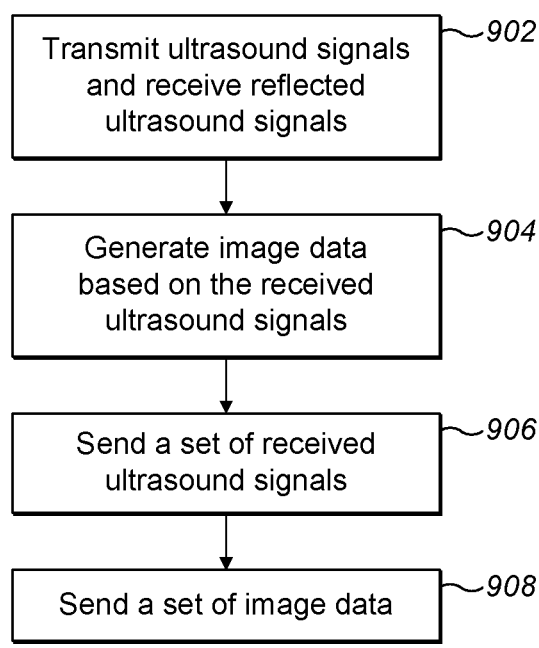
FIG. 9 shows a flowchart of a method of imaging structural features.

Reference in now made to FIG. 9, which shows a flowchart of a method of imaging structural features in an object. Ultrasound signals are transmitted towards the object to be scanned, and ultrasound signals reflected from the object are received (902). Based on the received ultrasound signals, image data representative of the object (e.g. of an interior of the object) is generated (904). This image data can take the form of one or more of A-scan image(s), B-scan image(s) and C-scan image(s). The method further comprises sending, for example using a communication module which might comprise a communication port, a set of received ultrasound signals (906). The set of received ultrasound signals can be a subset of the received ultrasound signals as discussed elsewhere herein. The set of received ultrasound signals can be sent to a remote device, e.g. a device remote from a scanning system used to scan the object. The method also comprises sending a set of image data (908). The set of image data can be a subset of the generated image data as discussed elsewhere herein. The set of image data can be sent using the communication module. The set of image data is sent subsequent to sending the set of received ultrasound signals.

The apparatus and methods described herein are particularly suitable for detecting debonding and delamination in composite materials such as carbon-fibre-reinforced polymer (CFRP). This is important for aircraft maintenance. It can also be used to detect flaking around rivet holes, which can act as a stress concentrator. The apparatus is particularly useful for detecting corrosion, welding, cracks, and so on, in metals or metallic structures.

The apparatus is particularly suitable for applications where it is desired to image a small area of a much larger component. The apparatus is lightweight, portable and easy to use. It can readily be carried by hand by an operator to be placed where required on the object.

The structures shown in the figures herein are intended to correspond to a number of functional blocks in an apparatus. This is for illustrative purposes only. The functional blocks illustrated in the figures represent the different functions that the apparatus is configured to perform; they are not intended to define a strict division between physical components in the apparatus. The performance of some functions may be split across a number of different physical components. One particular component may perform a number of different functions. The figures are not intended to define a strict division between different parts of hardware on a chip or between different programs, procedures or functions in software. The functions may be performed in hardware or software or a combination of the two. Any such software is preferably stored on a non-transient computer readable medium, such as a memory (RAM, cache, FLASH, ROM, hard disk etc.) or other storage means (USB stick, FLASH, ROM, CD, disk etc). The apparatus may comprise only one physical device or it may comprise a number of separate devices. For example, some of the signal processing and image generation may be performed in a portable, hand-held device and some may be performed in a separate device such as a PC, PDA or tablet. In some examples, the entirety of the image generation may be performed in a separate device. Any of the functional units described herein might be implemented as part of the cloud.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A scanning system for imaging structural features below the surface of an object, the scanning system comprising:
   a transducer module configured to transmit ultrasound signals towards an object and to receive ultrasound signals reflected from the object whereby data pertaining to an internal structure of the object can be obtained, the transducer module being configured to transmit and receive ultrasound signals for each of a first frame and a subsequent second frame in an ultrasound scan comprising the first and second frames;
   an image generation module configured to generate image data representative of the object based on the received ultrasound signals; and
   a communication module for communicating with a remote device, the communication module being configured to send, to the remote device:
      a set of received ultrasound signals based on ultrasound signals received during the first frame of the scan, and image data generated based on ultrasound signals received during the second frame of the scan.

2. A scanning system according to claim 1, in which the set of received ultrasound signals comprises one or more of: at least a subset of all the received ultrasound signals, amplitude data and/or time-of-flight data.

3. A scanning system according to claim 1, in which the communication module is configured to send the set of received ultrasound signals in response to a data transfer signal indicating that the set of received ultrasound signals is to be transferred to the remote device.

4. A scanning system according to claim 3, in which the data transfer signal is indicative of one or more of a feature in the received ultrasound signals, a relative location of the transducer module, a time signal, and a speed of movement of the transducer module.

5. A scanning system according to claim 4, in which the feature is identified based on the received ultrasound signals being representative of one or more of:
a change in a backwall of the object;
a change in a measure of corrosion of the object;
a change in a measure of porosity of the object;
delamination in the object;
a crack in the object; and
a void in the object.

6. A scanning system according to claim 4, comprising an analysis module configured to identify the feature in the received ultrasound signals.

7. A scanning system according to claim 1, in which the set of received ultrasound signals relates to a selected region of the object.

8. A scanning system according to claim 7, in which the analysis module is configured to identify the selected region of the object.

9. A scanning system according to claim 7, in which the selected region is selectable based at least in part on one or more of a measure of corrosion, a measure of porosity, a time-of-flight value or range of time-of-flight values, a standard deviation of values within the region, a variance of values within the region, and an average of values within the region.

10. A scanning system according to claim 7, in which the selected region is discontinuous within the object.

11. A scanning system according to claim 1, in which the communication module is configured to send to the remote device the image data during and/or following the second frame.

12. A scanning system according to claim 1, in which the communication module is configured to send to the remote device the set of received ultrasound signals during and/or following the first frame.

13. A scanning system according to claim 1, in which the communication module is configured to send to the remote device at least a portion of the set of received ultrasound signals concurrently with at least a portion of the image data.

14. A scanning system according to claim 1, in which the received ultrasound signals are binned into bins according to the location at which those received ultrasound signals were obtained and/or a time at which those received ultrasound signals were obtained.

15. A scanning system according to claim 14, in which data in the bins into which the received ultrasound signals are binned represent:
an average of the binned received ultrasound signals;
a weighted average of the binned received ultrasound signals, where each binned data value is weighted in dependence on a signal-to-noise ratio of that data value; or
a weighted and/or scaled average of the binned received ultrasound signals, where each binned data value is weighted and/or scaled in dependence on a characteristic of the transducer element from which that data value was obtained.

16. A scanning system according to claim 1, in which ultrasound signals are weighted and/or scaled in dependence on the transducer element from which those ultrasound signals were obtained.

17. A scanning system according to claim 1, in which the received ultrasound signals are stored in a tile map, where the dimensions of the tile map are modifiable as the transducer moves relative to the object.

18. A method of imaging structural features below the surface of an object, the method comprising:
transmitting ultrasound signals towards an object and receiving ultrasound signals reflected from the object whereby data pertaining to an internal structure of the object can be obtained, the transducer module being configured to transmit and receive ultrasound signals for each of a first frame and a subsequent second frame in an ultrasound scan comprising the first and second frames;
generating image data representative of the object based on the received ultrasound signals; and
sending to a remote device:
a set of received ultrasound signals based on ultrasound signals received during the first frame of the scan, and
image data generated based on ultrasound signals received during the second frame of the scan.

19. A scanning system for imaging structural features below the surface of an object, the scanning system comprising:
a transducer module configured to transmit ultrasound signals towards an object and to receive ultrasound signals reflected from the object whereby data pertaining to an internal structure of the object can be obtained, the transducer module being configured to transmit and receive ultrasound signals for each of a first frame and a subsequent second frame in an ultrasound scan comprising the first and second frames;
an image generation module configured to generate image data representative of the object based on the received ultrasound signals; and
a communication module for communicating with a remote device, the communication module being configured to send, to the remote device:
one or more of during and after the first frame of the scan, first image data generated based on ultrasound signals received during the first frame of the scan,
one or more of during and after the first frame of the scan, a set of received ultrasound signals based on the ultrasound signals received during the first frame of the scan, and
one or more of during and after the second frame of the scan, second image data generated based on ultrasound signals received during the second frame of the scan.

* * * * *